Aug. 17, 1943.  L. C. HUFF  2,327,045
CATALYTIC REACTOR
Filed Dec. 17, 1941   2 Sheets-Sheet 2

INVENTOR
LYMAN C. HUFF
BY *Lee J Barr*
ATTORNEY

UNITED STATES PATENT OFFICE 2,327,045

CATALYTIC REACTOR

Lyman C. Huff, Chicago, Ill., assignor to Universal Oil Products Company, Chicago, Ill., a corporation of Delaware Application December 17, 1941, Serial No. 423,269

8 Claims. (Cl. 23—288)

This invention relates to an improved form of apparatus in which various contact processes may be conducted and, more particularly, to a reactor in which a plurality of beds of solid granular contact material are disposed and are made readily accessible for removal and replacement. In the preferred embodiment of the invention the contact beds are disposed in a plurality of superimposed trays and the reactor is so constructed that removal of the trays from the reactor shell is unnecessary for placing the contact material within the trays or removing it therefrom.

The reactor provided by the invention is adapted to use in conducting a wide variety of catalytic conversion reactions and contact processes generally. It is particularly advantageous as applied to catalytically promoted hydrocarbon conversion reactions such as catalytic cracking and catalytic dehydrogenation.

Heretofore tray-type reactors have been limited in size because of the necessity of providing the reactor with a removable head spanning approximately the full diameter of the vessel to permit removal of the trays for emptying and refilling with fresh catalyst. The size of a satisfactory flanged joint for the removable head is limited due to the difficulty of maintaining a tight joint between large diameter flanges. Openings approximately six feet in diameter are about the maximum which can be safety employed on pressure vessels.

There is an acute need for reaction vessels of much larger size, say up to fifteen or sixteen feet in diameter, in order to obviate the use of a plurality of small reactors connected for parallel flow therethrough so as to provide sufficient contact space for conducting the desired conversion. When using a plurality of reactors arranged for parallel flow the added cost of the necessary piping and fittings greatly exceeds the expense involved in constructing a large reactor of the same total capacity, particularly when the operating pressure is relatively low, as in catalytic cracking and dehydrogenation for example.

The present invention provides a tray type reactor in which the necessity for a large diameter removable head is obviated, so that this limitation to the size of the vessel is eliminated. The trays for the catalyst or contact material may be built in place as the vessel is constructed and the only access openings required during the life of the vessel and trays are comparatively small and inexpensive manways located in one or both heads of the reactor.

One feature of the invention resides in the means provided for preventing any incoming reactant materials from reaching the outlet of the reactor without first contacting the desired quantity of granular contact material. This means comprises a detachable cylindrical or skirt-like baffle depending from the bottom of each tray and projecting downward into the bed of contact material disposed in the succeeding lower tray of the assembly.

The reactor is also provided with a substantially central conduit extending longitudinally through the tray assembly and constructed in sections detachably secured to the trays. By detaching sections of this conduit and the baffles above mentioned from the trays the catalyst or contact material on the trays can be readily removed and replaced without otherwise disturbing the trays.

The various features of the invention and their advantages will be more readily apparent with reference to the accompanying diagrammatic drawings and the following description thereof.

Figure 1 of the drawings is an elevational view of one preferred form of reactor provided by the invention. In this view the reactor and some of the trays are shown in section.

Figure 1:
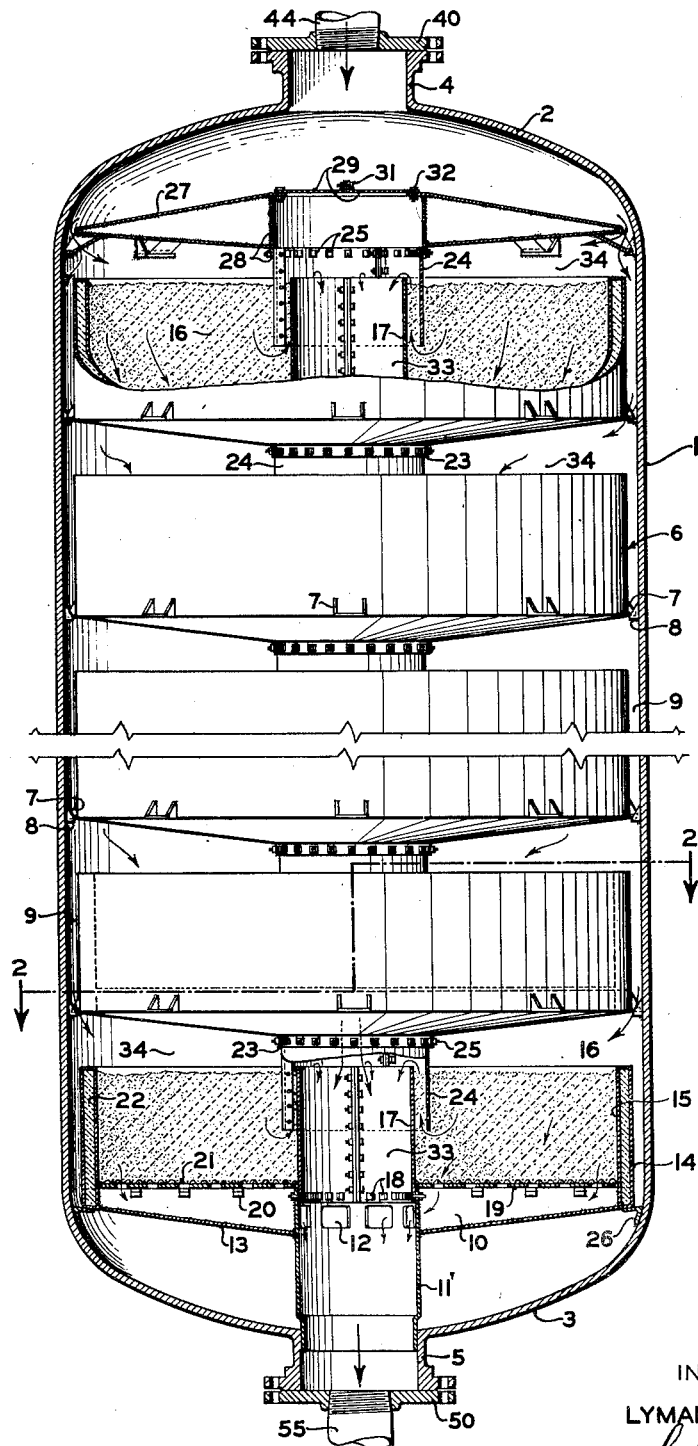
Figure 2:
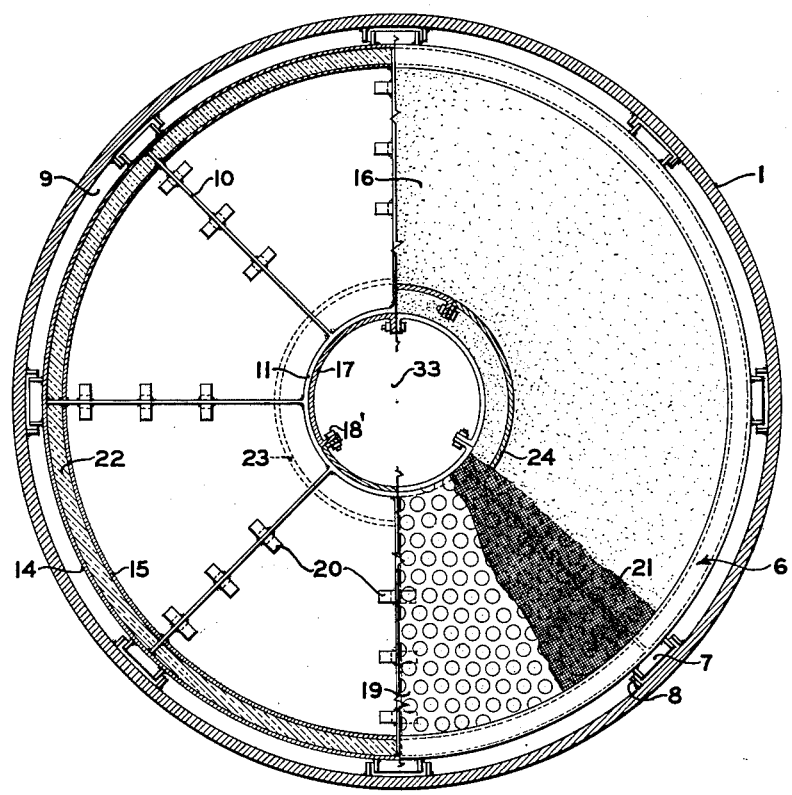
Figure 2 is a sectional plan view of the reactor illustrated in Figure 1, the section being taken along line 2—2 in Figure 1.

Referring to the drawings, the reactor comprises an elongated cylindrical shell 1, closed at its top and bottom ends by the heads 2 and 3 respectively. The top head 2 is provided with a flanged manway 4 provided with removable closure flange 40 carrying inlet conduit 44. The bottom head 3 is provided with a similar flanged manway 5 and removable closure flange 50 carrying outlet conduit 55.

When desired, the flow of reactants through the reactor may be reversed, i. e., the reactant materials may be introduced to the reactor through conduit 55, and the fluid reaction products may be removed through the conduit 44.

Disposed within the reactor are a plurality of superimposed trays 6, each adapted to receive and retain a bed of granular contact material. These trays are individually supported from the shell by suitable lugs 7 attached to the trays at spaced points about their circumference and engaging brackets 8 which are provided on shell 1 at spaced points about its inner circumference and at the approximate level of each tray.

The reactor shell and trays are preferably constructed of suitable metal or alloy capable of withstanding the operating conditions to which they are subjected and of sufficient structural strength to support the load imposed thereon.

The outside diameter of the individual trays is sufficiently less than the inner diameter of the shell so that an annular space 9 is provided therebetween, the purpose of which will be later explained.

Figure 3:
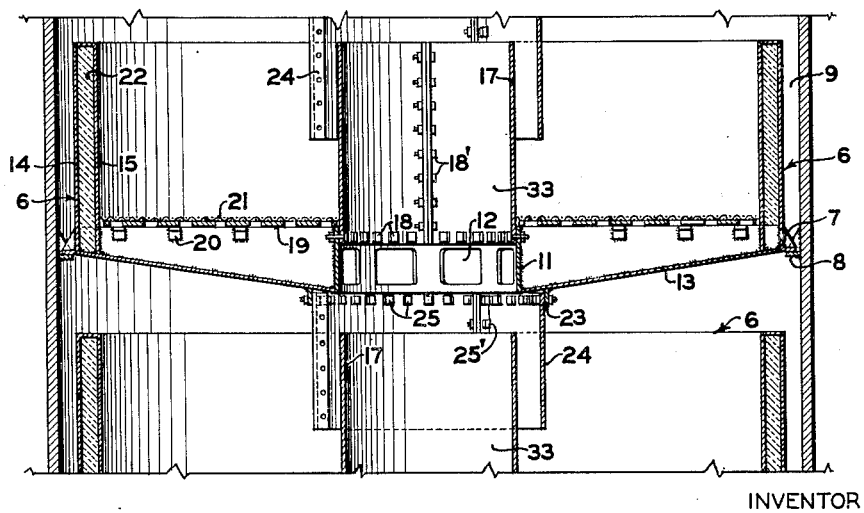
Figure 3 is an enlarged elevational view, shown principally in section, of an intermediate portion of the same reactor with the catalyst removed from the trays to more clearly illustrate their construction.

In the preferred form of tray, as here illustrated, a plurality of radially disposed ribs 10 are provided in each tray. At their inner ends these ribs 10 are secured by welding, or in any other desired means, to a short cylindrical member 11 (see Figure 3), which is provided with a plurality of openings or ports 12 therethrough. The substantially conical bottom walls 13 of the trays are secured to the lower edges of the ribs 10 and to members 11. Substantially cylindrical outer walls 14 of the trays are welded or otherwise suitably secured to the ribs 10 and the bottom wall 13. In some processes it is desired to insulate the annular space 9 from the catalyst bed. This is done when desired by providing another cylindrical wall 15 concentric with and spaced inwardly a short distance from member 14 to provide a space therebetween in which suitable insulating material 22 is disposed.

Defining the inner extremity of the catalyst bed 16 on the tray is a cylindrical member 17 made up of a plurality of segments which are detachably secured at their lower ends to the member 11 by means of bolts 18. The individual segments of member 11 may be secured together along their adjacent turned in edge portions by means of similar bolts 18 passing through holes provided therein.

Disposed above the bottom wall 13 of the tray is a perforate plate or false bottom 19 which may be supported on ribs 10, or, when desired, on suitable brackets 20, which are secured to the ribs by welding or any other desired manner.

When contact material of relatively small particle size is used, a screen 21, the mesh size of which is sufficiently small to retain said particles, may be disposed upon the perforate member 19.

Depending from and secured to the bottom wall 13 of each tray, with the exception of the lowermost tray in the reactor, is a continuous relatively short cylindrical member 23, to which a cylindrical or skirt-like baffle 24 is detachably secured by bolts 25. Baffles 24 in the case illustrated are each made up of a plurality of segments joined along their adjacent turned in edges by bolts 25'.

The baffle 24 extends downward from the tray to which it is attached into the bed of contact material on the succeeding lower tray for a distance equal to a least one half of the total depth of the bed, so that any reactants entering the bed must traverse a path, in contact with the granular material, equal to or greater in length than the distance straight through the bed.

The lowermost tray, instead of being supported from a plurality of spaced brackets and lugs, rests upon a continuous angle 26 welded to the shell. In addition to serving as a support for the lowermost tray, member 26 assists in preventing reactants reaching the outlet of the reactor without first traversing a bed of contact material. In this tray the member 11', which replaces the member 11 of the higher trays, is extended downward to and engages the flanged opening 5 and forms a seal auxiliary to the one formed between the lower tray and the angle 26.

A baffle 27 is disposed above the uppermost tray of the assembly and serves to direct incoming fluid reactants from inlet conduit 44, into the annular space 9 from which, by means of the spaces 34, they are distributed to the various trays. This baffle has depending from its bottom a continuous member 28 to which a baffle 24 is detachably secured by the bolts 25. The central portion of baffle 27 is provided with an opening therethrough having a removable closure member 29 comprising two semi-circular shaped members which are secured together along their adjacent turned up edge portions by bolts 31. The closure member is detachably secured to the baffle 27 by means of bolts 32 which engage nuts welded to the baffle.

By removing this closure member 29 access may be had to the central conduit space 33 defined by the members 11 and 17, of the various trays.

In operation, when employed for example in a process for the catalytic cracking of hydrocarbon oils, the incoming reactants, preheated to a degree sufficient that the desired conversion will take place when they contact the cracking catalyst in the trays, enter through the inlet conduit 44 and are directed through the annular space 9 and as a plurality of separate streams of substantially equal volume through communicating spaces 34 into the catalyst beds on the trays. Upon leaving the catalyst beds the resulting fluid reaction products are directed through the space defined between the perforate plate 19 and the bottom member 13 of the tray through the ports 12 into the central conduit space 33. From the central conduit space 33 the reaction products are directed through outlet conduit 55 to suitable separating and recovery equipment not shown.

After a period of time during which the cracking reaction is continuously conducted in the reactor the catalyst will acquire a deposit of deleterious heavy conversion products of a carbonaceous or hydrocarbonaceous nature. This deposited material must be removed to regenerate the catalyst and render it suitable for further use in promoting the cracking reaction. This regeneration is accomplished by passing a stream of hot oxygen-containing gases in contact with the catalyst to burn the combustible contaminating material therefrom. The flow of regenerating gases and resulting combustion products through the reactor may be the same as that, above described, for the hydrocarbon reactants and fluid conversion products.

After a prolonged period of operation in which the catalyst has alternately been used in the conversion reaction and undergone regeneration its activity for promoting the cracking reaction will be depleted to such an extent that it should be replaced. This is easily accomplished when employing a reactor of the improved form disclosed herein.

To remove the catalyst from the reactor all that is necessary is to remove the flanged closure members 40 and 50 from manways 4 and 5, detach the members 29 from baffle 27, so that a continuous passage is opened through the mid-portion of the reactor, from which a man may work to detach the removable members 17 and 24 from the various trays and expose the catalyst beds. The catalyst may then be shoveled or raked into the central conduit 33 to fall out through the lower manway 5, or a suction hose may be used to transport it out of the reactor. When desired the catalyst may be enclosed in screen mesh bags to facilitate its introduction to and removal from the trays.

In filling the trays with fresh catalyst, members 17 are replaced and reattached to the trays after the segments of baffles 24 are assembled out but before these baffles are attached to members 23. The catalyst is then spread on the trays and the baffles 24 thereafter raised into position and secured to members 23. When loose catalyst is employed it may be raised or lowered to the level of the various trays in buckets or other suitable containers, or when desired a flexible hose may be used to transport it and feed it onto the trays by pneumatic pressure.

After the catalyst has been replaced, the various removable members 17, 24, 29, 40 and 50 are reattached and the inlet and outlet conduit connections replaced. The reactor is then ready in condition for further operation.

I claim as my invention:

1. A reactor of the class described comprising, in combination, an elongated reactor shell, a plurality of trays disposed within said shell in superimposed spaced apart relation, each of said trays having a central inner and an outer defining wall with an annular space provided therebetween for the reception of a bed of granular contact material, a perforate false bottom defining the lower limit of said bed on each tray and an imperforate bottom wall spaced from said false bottom and extending between the inner and outer walls, a skirt-like baffle depending from and detachably secured to the bottom wall of each tray except the lowermost tray of the assembly and extending into the space occupied by said contact material on the succeeding lower tray, said inner wall on each tray comprising a lower section provided with openings therethrough, which communicate with the space between said bottom wall and false bottom, and an upper section detachably secured to said lower section.

2. A reactor such as defined in claim 1, wherein said baffles and the upper sections of said inner walls comprise longitudinally divided and detachably engaged sections.

3. A reactor such as defined in claim 1, wherein said baffles and the upper sections of said inner walls comprise detachably engaged longitudinal segments.

4. A reactor such as defined in claim 1, wherein said reactor shell is provided with closed ends, each having a man-way therein, one of said man-ways being in unobstructed communication with a central conduit space formed within said tray assembly by said central walls and baffles, the end of said conduit space remote from said communicating man-way being normally closed by a removable closure member, said conduit space communicating with the other man-way when said closure member is removed.

5. A reactor such as defined in claim 1, wherein said reactor shell is provided with closed ends each having a man-way therein and wherein said trays are sufficiently smaller than the shell to provide an annular conduit space therebetween communicating with the spaces between adjacent superimposed trays, one of said man-ways being in direct communication with said annular conduit space and the manway in the opposite head being in direct communication with a central conduit space within the tray assembly defined by said central walls and baffles of the trays, said central conduit space and annular conduit space being in communication only through said beds on the tray.

6. A reactor such as defined in claim 1, wherein said reactor shell is provided with closed ends each having a man-way therein and wherein said trays are sufficiently smaller than the shell to provide an annular conduit space therebetween communicating with the spaces between adjacent superimposed trays, one of said man-ways being in direct communication with said annular conduit space and the man-way in the opposite head being in direct communication with a central conduit space within the tray assembly defined by said central walls and baffles of the trays, and means preventing communication between said man-ways on the opposite heads of the reactor shell except through said beds of contact material, said means comprising the central walls and baffles of the trays and a removable closure member at that end of the central conduit space removed from the man-way communicating with the latter.

7. A reactor such as defined in claim 1, wherein said trays are individually supported from the shell of the reactor.

8. A reactor such as defined in claim 1, wherein the outer walls of said trays comprise spaced apart metallic members with heat-insulating material disposed therebetween.

LYMAN C. HUFF.